United States Patent Office.

GERVAIS CHEVRIER, OF PARIS, FRANCE.

Letters Patent No. 106,915, dated August 30, 1870.

IMPROVEMENT IN TREATING ACID TARS FROM COAL.

The Schedule referred to in these Letters Patent and making part of the same.

*To all whom it may concern:*

Be it known that I, GERVAIS CHEVRIER, of Paris, in the Empire of France, have invented a new and useful Improvement in the Treatment of Acid Tars obtained from coal, bituminous schists, and petroleum, and I do hereby declare that the following is a full, clear, and exact description of the same.

It is well known that the crude products obtained from the distillation of bituminous schists, bog-head coal, and petroleum, are, at first, submitted to a purification in a still, from which passes over a brown oil, presenting a greenish reflection, and very strong smelling.

This oil, placed in an open receiver, lined with lead and furnished with a mechanical agitator, is treated with sulphuric acid, to separate from it an acid tar which has passed over it in the distilling process. This tar is, in general, thrown away as refuse. It will, therefore, be easy to understand the importance of a process permitting the complete separation of the tar, in such manner as to render it commercially valuable, and, at the same time, to engage the sulphuric acid in a chemical combination of an industrial value, which may become equal to that of the acid, and that of the reagent employed. This is the object of the present invention, which consists in the treatment of the acid tar with a concentrated solution of chloride of sodium, or chloride of ammonium, by which are obtained sulphate of soda, or sulphate of ammonia, and muriatic acid.

I will particularly describe the treatment with chloride of sodium, (culinary salt,) which is as follows:

Suppose one thousand pounds of acid, tar, or oil, containing thirty per cent., say three hundred pounds of sulphuric acid, it should be treated with three hundred and sixty pounds of culinary salt, dissolved in the smallest possible quantity of warm water, say one hundred gallons. This solution is poured upon the tar or oil, which has been first placed in the receiver. By degrees, by agitation, the tar or oil loses its acid, and comes to the surface. After a treatment of one hour the contents of the receiver are allowed to remain at rest from ten to twelve hours, after which the acid liquor is withdrawn by a cock at the bottom of the receiver, or by means of a siphon.

This acid solution is to be evaporated to dryness, and calcined by any of the known methods commonly practiced in the manufacture of sulphate of soda and muriatic acid.

The treatment is the same for acid oils, but does not require to be continued for so long a time. Half an hour of agitation of the oil and saline solution in contact, and two hours of subsequent repose, are sufficient to complete the extraction of the acid.

With regard to acid waters, resulting from the washing of oils, they may be treated directly with the salt, without dissolving it, and then evaporating the liquor and calcining, as above described.

The anhydrous sulphate of soda obtained in these different cases may be dissolved in a little warm water. One thousand pounds of this salt require but about three hundred to three hundred and twenty pounds of water, at a temperature of 85° to 100° Fahrenheit. By cooling, this solution deposits large crystals of Glauber's salt.

The tar, which has been separated by the treatment with the solution of chloride of sodium, is afterwards washed with water, or a very weak alkaline or ammoniacal solution.

Chloride of ammonia may be used instead of chloride of sodium, in case the former is produced near the place where the process is performed. Sulphate of ammonia is then obtained in place of sulphate of soda.

What I claim as my invention, and desire to secure by Letters Patent, is—

The treatment of acid tars and oils with chloride of sodium or chloride of ammonium, whereby the residuum from distillation of coal-oils may be purified, and the acids utilized in the manner substantially as and for the purpose herein specified.

CHEVRIER.

Witnesses:
DUMAS,
DUCHENE.